| United States Patent [19] | [11] Patent Number: 4,752,795 |
|---|---|
| Malloy-Desormeaux | [45] Date of Patent: Jun. 21, 1988 |

[54] CAMERA CAPABLE OF INITIALIZING FILM IN NON-PICTURE TAKING MODE

[75] Inventor: Stephen G. Malloy-Desormeaux, Rochester, N.Y.

[73] Assignee: Eastman Kodak Company, Rochester, N.Y.

[21] Appl. No.: 10,935

[22] Filed: Feb. 5, 1987

[51] Int. Cl.[4] .............................................. G03B 1/12
[52] U.S. Cl. ................................ 354/173.11; 354/268
[58] Field of Search ................. 354/173.1, 173.11, 268

[56] References Cited

U.S. PATENT DOCUMENTS

| 3,465,658 | 9/1969 | Hackenberg | 95/31 |
|---|---|---|---|
| 3,470,799 | 10/1969 | Engelsmann | 95/10 |
| 3,665,830 | 5/1972 | Maeda | 95/31 |
| 4,038,672 | 7/1977 | Kondo et al. | 354/212 |
| 4,134,657 | 1/1979 | Nomura | 354/212 |
| 4,334,753 | 6/1982 | Harvey | 354/289 |
| 4,340,291 | 7/1982 | Berg | 354/215 |
| 4,396,270 | 8/1983 | Suzuki | 354/268 |
| 4,586,801 | 5/1986 | Nishizawa et al. | 354/173.1 |
| 4,610,522 | 9/1986 | Tobioka et al. | 354/173.1 |

FOREIGN PATENT DOCUMENTS

| 49-30503 | 8/1974 | Japan. |
|---|---|---|
| 57-35840 | 2/1982 | Japan. |
| 57-67920 | 4/1982 | Japan. |

*Primary Examiner*—Michael L. Gellner
*Attorney, Agent, or Firm*—Roger A. Fields

[57] ABSTRACT

A film drive in a camera is actuated to advance a filmstrip from a cartridge to position respective frames on the filmstrip for exposure. Normally the film drive is disabled to prevent advancement of the filmstrip when the camera is in a non-picture taking or storage mode, as for example when an integral lens cover of the camera is closed. An exception is created, however, whereby the film drive may be actuated to initialize a fresh film load by advancing the filmstrip to position its first frame for exposure even though the lens cover is closed. This is possible when respective sensor devices in the camera determine that a cartridge is in the camera but the filmstrip has not been initialized. Exposure of the first frame on the filmstrip can not occur unless the lens cover is opened.

7 Claims, 7 Drawing Sheets

CAMERA CAPABLE OF INITIALIZING FILM IN NON-PICTURE TAKING MODE

CROSS-REFERENCE TO A RELATED APPLICATION

Reference is made to commonly assigned, copending patent application Ser. No. 869,523, entitled FRAME COUNTER INITIALIZATION SENSOR FOR TRIGGERING FILM REWIND WHEN CAMERA DOOR OPENED PREMATURELY, and filed June 2, 1986 in the name of Stephen Malloy Desormeaux now U.S. Pat. No. 4,671,636.

BACKGROUND OF THE INVENTION

1. Field of the Invention

The invention relates generally to the field of photographic cameras and in particular to a camera of the type wherein exposure of the film in the camera is prevented when an integral lens cover is positioned in front of the objective lens.

2. Description of the Prior Art

Typically in a number of 35 mm and other format cameras there is provided an integral lens cover which is normally closed to protect the objective lens from scratches, finger prints, dust, and the like and must be opened before taking a picture. Most cameras having an integral lens cover include some mechanical means for interlocking the lens cover and a manually depressible shutter release button. The interlock prevents the camera shutter from being actuated to take a picture when the lens cover is closed.

Often, to initialize a fresh film load in known cameras having an integral lens cover, that is, to advance the film to position its first frame for exposure, the shutter release button must be manually depressed several times. Each time the shutter release button is depressed, a film winding motor in the camera is actuated to advance the film approximately the width of one frame. Usually, the winding motor must be actuated at least two times to wind a leader portion of the film onto a take-up spool. Then, the winding motor is actuated a third time to position the first frame for exposure.

A feature of known cameras having an integral lens cover is that a fresh film load cannot be initialized unless the lens cover is opened. This is disadvantageous because there may be conditions, e.g., a dusty environment, in which it is desirable to initialize the film with the lens cover closed.

SUMMARY OF THE INVENTION

The invention provides a photographic camera which is improved to permit a fresh film load to be initialized by advancing the film to position its first frame for exposure even though the camera is in a non-picture taking or storage mode, as for example when an integral lens cover of the camera is closed.

According to the invention, a film drive in the camera is actuated to advance a filmstrip from a cartridge to position respective frames on the filmstrip for exposure. Normally the film drive is disabled to prevent advancement of the filmstrip when the camera is in a non-picture taking or storage mode, e.g., when an integral lens cover is closed. An exception is created, however, whereby the film drive may be actuated to initialize a fresh film load by advancing the filmstrip to position its first frame for exposure even though the camera is in the non-picture taking mode. This is possible when sensing means in the camera determines that a cartridge is in the camera but the filmstrip has not been initialized. Exposure of the first frame on the filmstrip cannot occur unless the camera is in a picture-taking mode, e.g., when the lens cover is opened.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a 35 mm camera. Because the features of this type of camera are generally well known, the description which follows is directed in particular to photographic elements forming part of or cooperating directly with the disclosed embodiment. It is understood, however, that other elements not specifically shown or described may take various forms known to persons of ordinary skill in the art.

Figure 1:
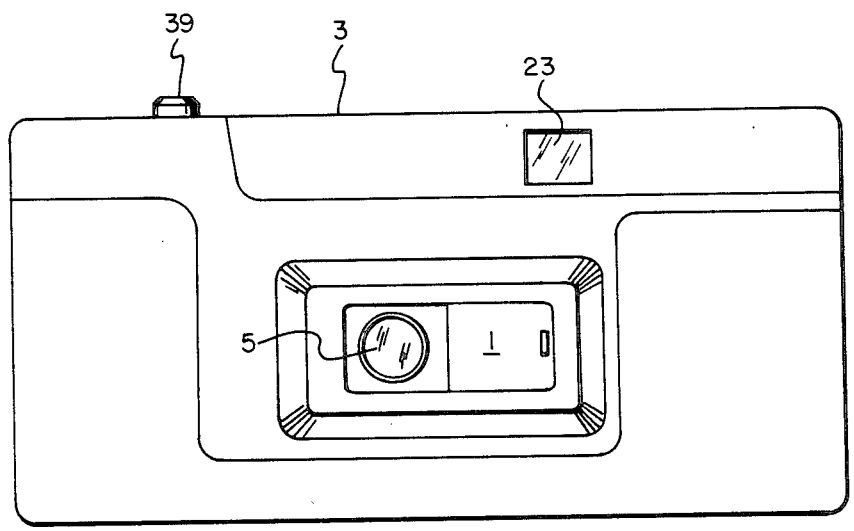
FIG. 1 is a front elevation view of a camera capable of initializing film in a non-picture taking mode according to a preferred embodiment of the invention, showing the camera with an integral lens cover opened to uncover the objective lens.
Figure 2:
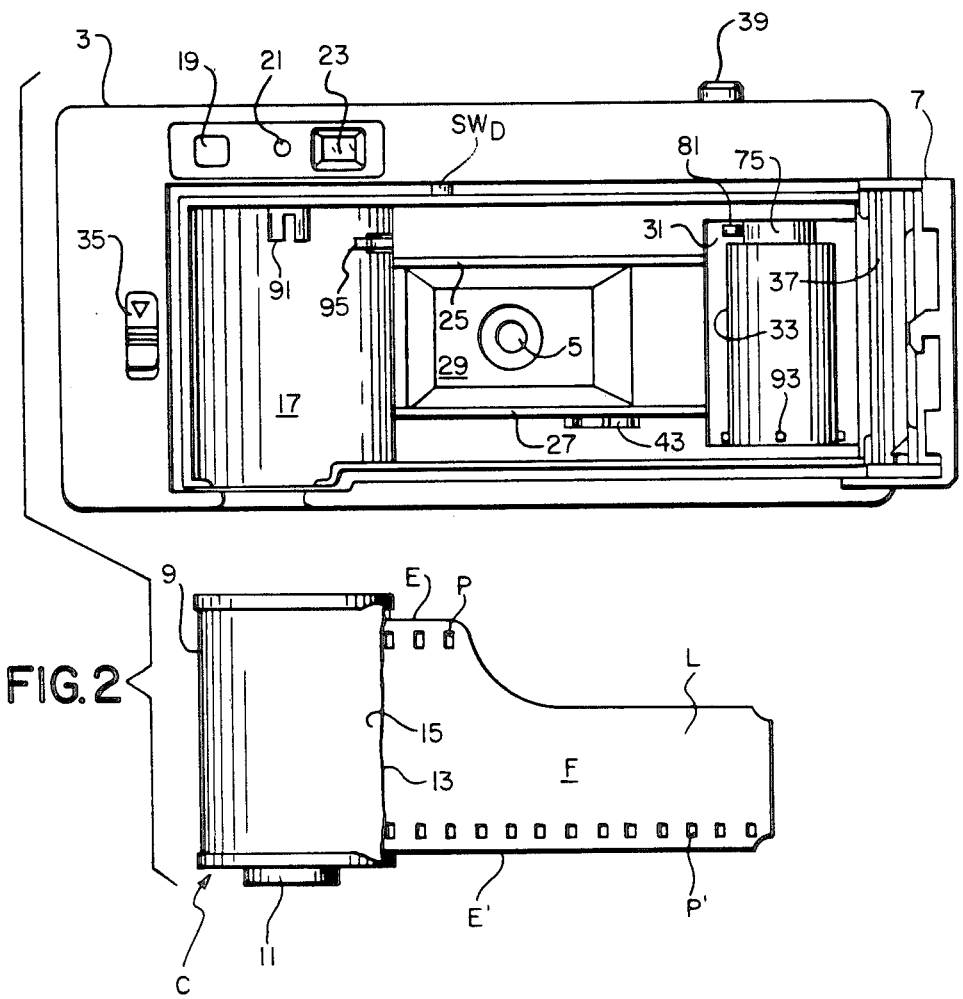
FIG. 2 is a rear elevation view of the camara, showing the camera with its back door opened to receive a film cartridge.

Referring now to the drawings and in particular to FIGS. 1 and 2, a 35 mm camera is shown with an integral lens cover 1 slidably mounted on a front face of the camera body 3, opened to uncover an objective lens 5, and with a back door 7 pivotally mounted on a rear portion of the camera body, opened to receive a known film cartridge C, such as one manufactured by Eastman Kodak Company. The film cartridge C comprises a light-tight container 9 housing a rotatably supported spool 11 on which is wound an edge-perforated 35 mm filmstrip F. As viewed in FIG. 2, the filmstrip F has an upper row of perforations P adjacent a longitudinal edge E and a lower row of perforations P' adjacent a longitudinal edge E'. A leader portion L of the filmstrip F projects from a plush-lined, light trapping slit 13 in a throat 15 of the cartridge C and has a forward end portion whose width is approximately one-half of the width of the remainder of the filmstrip. The 35 mm camera includes a number of known elements, such as a loading chamber 17 for receiving the cartridge C; a flash ready lamp 19 for a built-in electronic flash, not shown; a low light warning lamp 21; a viewfinder window 23; a pair of substantially parallel film rails 25 and 27; a film exposure window 29 for the objective lens 5; a film take-up chamber 31 housing a film take-up spool 33 or drum; a manually operable latch 35 for securing the back door 7 closed; a pressure plate 37 spring-supported on the inside of the back door for holding successive frames on the filmstrip F flat on the pair of film rails 25 and 27 during film exposure at the exposure window 29; and a shutter release button 39 manually depressible to initiate film exposure. In operation, substantially the entire length of the filmstrip F is prewound without interruption from the cartridge C onto the take-up spool 33 before any exposures are taken at the exposure window 29. Then, after each exposure at the window 29, the filmstrip F is rewound one frame at a time back into the cartridge C. This is done to protect the exposed frames on the filmstrip F, for example, should the rear door 7 be accidentally or inadvertently opened prematurely, i.e., before the filmstrip is rewound completely into the cartridge.

Figure 3:
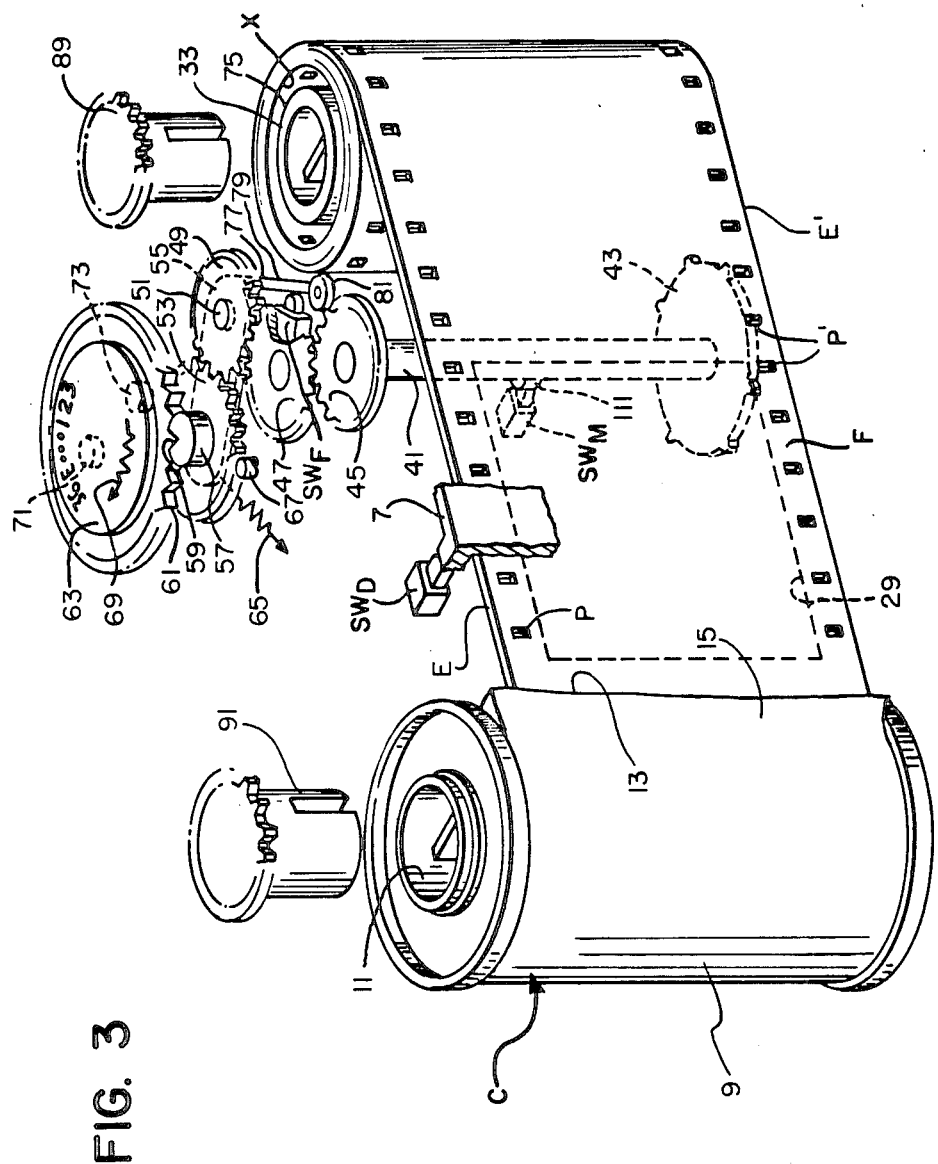
FIG. 3 is a perspective view of film drive apparatus in the camera.
Figure 4:
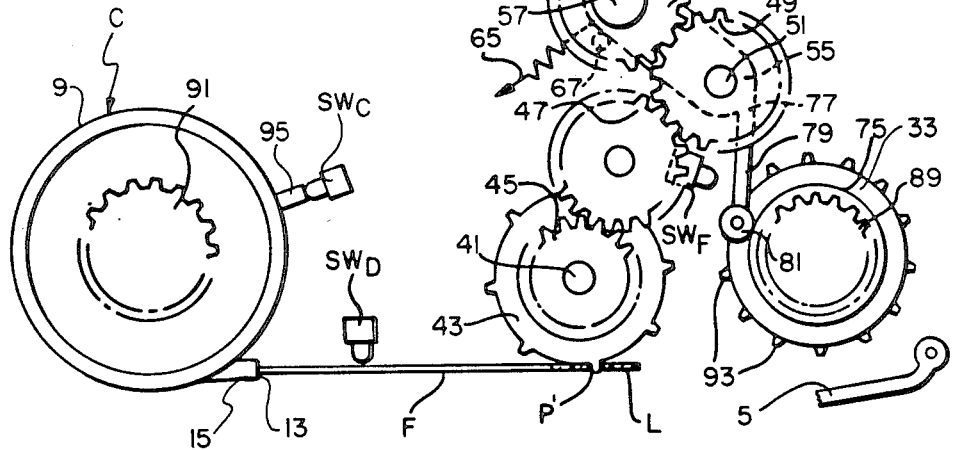
FIG. 4 is a top plan view of the apparatus depicted in FIG. 1, shown with the rear door of the camera opened.

As shown in FIGS. 3 and 4, a coaxial shaft 41 connects a metering sprocket 43 and a metering gear 45 to enable the sprocket and the gear to rotate in unison. The metering sprocket 43 engages the lower row of perforations P' in the filmstrip F as the filmstrip is first prewound onto the take-up spool 33 and then is rewound back into the cartridge C. The metering gear 45 continuously engages an intermediate gear 47 which, in turn, continuously engages a pivot gear 49. The pivot gear 49 is supported for rotation about a pivot shaft 51 and continuously engages a counter gear 53. A swing plate 55 on which the pivot gear 49 and the counter gear 53 are disposed is supported on the shaft 51 for pivotal movement about the shaft without disengaging the pivot gear from the counter gear or the intermediate gear 47. A motion-transmitting stud 57 is coaxially fixed on the counter gear 53 and has a single recess 59 for receiving successive peripheral teeth 61 of a rotatable counter disk 63 to rotate the disk in accordance with rotation of the counter gear. The counter disk 63 is located on the outside of the camera and has thirty-six evenly spaced settings represented by the numbers "1, 2, 3, . . . 36" imprinted on the disk. These numbers correspond to successive frames on the filmstrip F. An original empty setting of the counter disk 63 is represented by the letter "E" imprinted upon the disk. This is to indicate that the camera is empty.

When the filmstrip F is pre-wound onto the take-up spool 33, the metering sprocket 43 is rotated by prewinding movement of the filmstrip to increment the counter disk 63 from its original "E" setting to a maximum number setting, such as the "36" setting or a lesser number setting, to indicate the maximum number of unexposed frames on the filmstrip F. Conversely, as the filmstrip F is rewound back into the cartridge C after each exposure, the metering sprocket 43 is rotated by rewinding movement of the filmstrip to decrement the counter disk 63 one setting at a time from its maximum number setting to indicate the remaining number of unexposed frames on the filmstrip. In operation, the metering sprocket 43, the gears 45, 47, 49, and 51, and the motion-transmitting stud 57 are each rotated one revolution between successive frames.

Normally, as shown in FIG. 4, a relatively light separating spring 65 urges the swing plate 55 to pivot in a counter-clockwise direction about the shaft 51 into abutment against a stop pin 67 on the camera body 3. This will cause the motion-transmitting stud 57 to move out of its position against at least one of the peripheral teeth 61 of the counter disk 63 to thereby release the counter disk. Release of the counter disk 63 allows a relatively light initializing spring 69 to rotate the counter disk to reset the disk to its original "E" setting. A stop pin 71 on the underside of the counter disk 63 will contact a stop pin 73 on the camera body 3 to halt the counter disk at its "E" setting. When the motion-transmitting stud 53 is in its position against at least one of the peripheral teeth 61 of the counter disk 63, the initializing spring 69 is not strong enough to rotate the counter disk. A means for moving the motion-transmitting stud 57 to its position against at least one of the peripheral teeth 61 of the counter disk 63 is described below.

Figure 5:
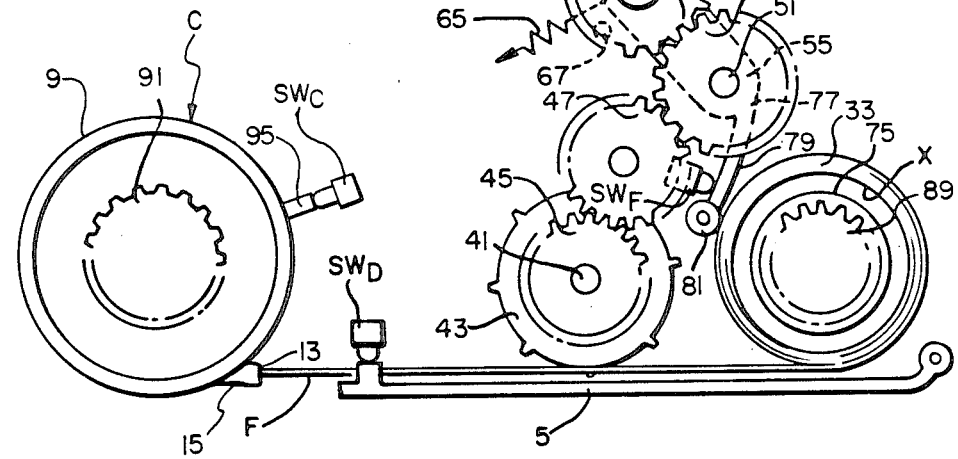
FIG. 5 is a top plan view of the apparatus depicted in FIG. 1, shown with the rear door of the camera closed.

The take-up spool 33 includes a relieved annular portion 75 on its peripheral edge having a smaller diameter than the remainder of the take-up spool. A film-on-spool sensor 77, integrally formed with the swing plate 55, includes a resiliently flexible sensing finger 79 for sensing the presence and the absence of the filmstrip F on the take-up spool 33. As shown in FIG. 4, the separating spring 65 urges the swing plate 55 to position an idler roller 81 on a free end of the sensing finger 79 in abutment against the relieved annular portion 75 of the take-up spool 33. In this instance, the motion-transmitting stud 57 is removed from its position against at least one of the peripheral teeth 61 of the counter disk 63, and the counter disk is reset to its "E" setting by the initializing spring 69. When the leader portion L of the filmstrip F is wound onto the take-up spool 33, a longitudinal (full width) section X of the first convolution of the filmstrip will be spaced opposite the relieved annular portion 75. See FIG. 5. The idler roller 81 will ride on the longitudinal section X, thereby being separated from the relieved annular portion 75. This causes the sensing finger 79 of the film-on-spool sensor 75 to pivot the swing plate 55 in a clockwise direction about the shaft 51 until the motion-transmitting stud 57 is moved to its position against at least one of the peripheral teeth 61 of the counter disk 63. If the rear door 7 is accidentally or inadvertently opened when the filmstrip F is wound at least partly on the take-up spool 33, the counter disk 63 cannot be reset to its original "E" setting by the return spring 69 because the motion-transmitting stud 57 remains in its position against at least one of the peripheral teeth 61 of the counter disk.

Figure 6:
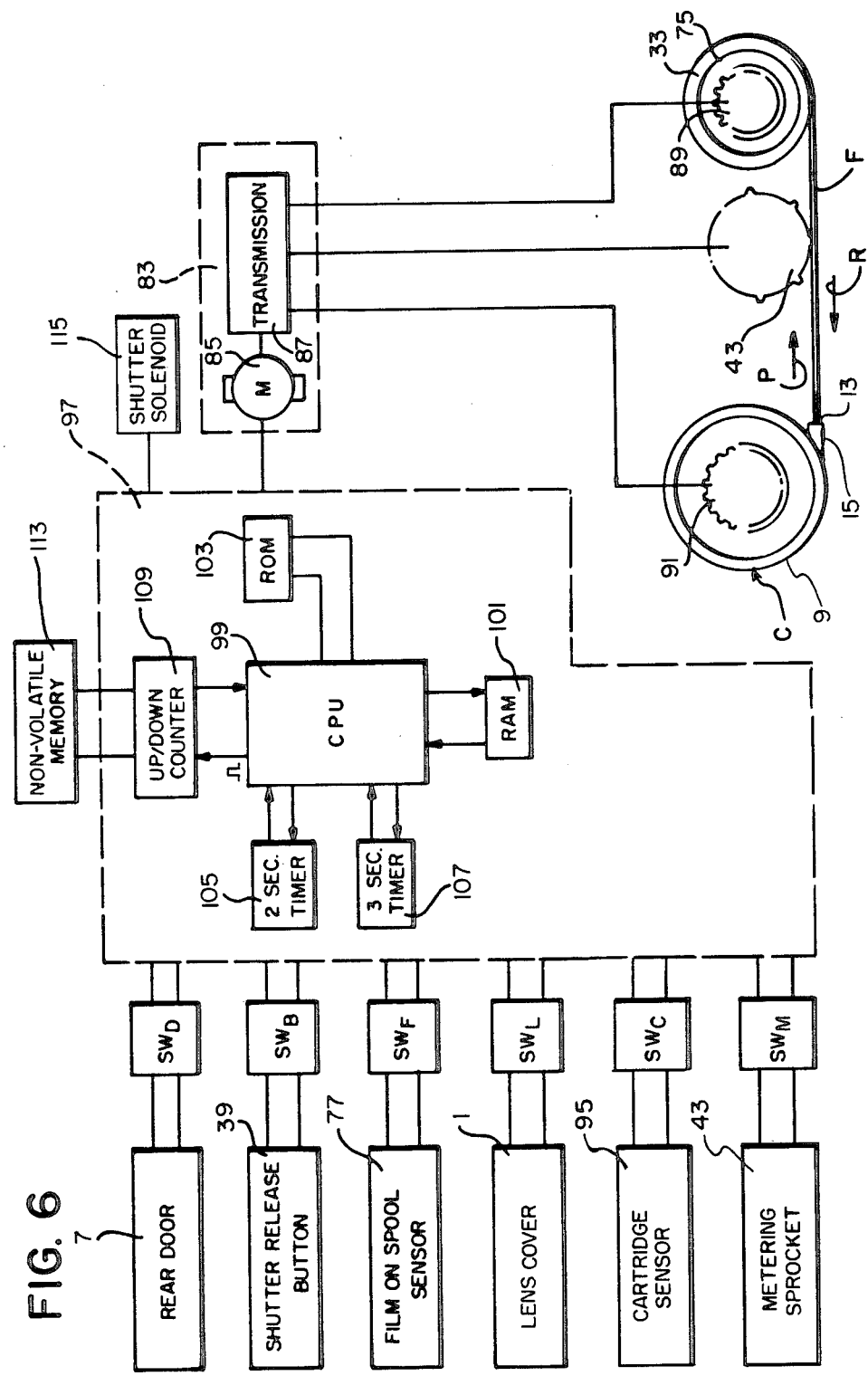
FIG. 6 is a schematic representation of a control circuit in the camera.

In FIG. 6, there is schematically depicted a motorized film drive mechanism 83 comprising a conventional bi-directional motor 85 and a conventional drive transmission 87. As shown, the transmission 87 is coupled to the metering sprocket 43 and to respective drive hubs 89 and 91 which engage the take-up spool 33 and the supply spool 11 of the cartridge C. When the cartridge C is loaded in the camera, as shown in FIG. 4, the leader portion L of the filmstrip F is placed over the metering sprocket 43 to position one or more successive perforations P' in the leader portion in engagement with the sprocket. The motorized film drive mechanism 83 initially rotates the metering sprocket 43 in order to advance the leader portion L of the filmstrip F onto the take-up spool 33. The take-up spool 33 has respective teeth 93 for engaging the successive perforations P' in the leader L of the filmstrip F and is rotated by the motorized film drive mechanism 83 at a faster speed than the metering sprocket 43. A film tension responsive clutch, not shown, in the transmission 87 de-couples the metering sprocket 43 from its rotational drive in response to the resulting pull on the filmstrip F caused by engagement of the leader portion L of the filmstrip to the faster rotating take-up spool 33. Thereafter, the metering sprocket 33 operates in an idling capacity, that is, it is rotated by movement of the filmstrip F.

As shown in FIG. 6, there are provided respective switches $SW_D$, $SW_B$, $SW_F$, $SW_L$, $SW_C$, and $SW_M$ operatively associated with the rear door 7, the shutter release button 39, the film-on-spool sensor 77, the lens cover 1, a cartridge sensor 95 and the metering sprocket 43. In turn, the switches $SW_D$, $SW_B$, $SW_F$, $SW_L$, $SW_C$, and $SW_M$ are connected individually to a conventional digital microcomputer 97 such as used in many cameras. The microcomputer 97 includes a central processing unit (CPU) 99, a random access memory (RAM) 101, a read only memory (ROM) 103, a two second timer 105, a three second timer 107, and an up/down counter 109. As is described below, the microcomputer 97 is used to control operation of the motorized film drive mechanism 83 to prewind the filmstrip F onto the take-up spool 33 and to rewind the filmstrip back into the cartridge C. The switch $SW_D$ is closed when the rear door 7 is closed and is opened when the rear door is opened. The switch $SW_B$ is closed each time the shutter release button 37 is depressed and is opened when the button is released. The switch $SW_F$ is closed by the sensing finger 79 of the film-on-spool sensor 77 when the sensing finger is moved away from the take-up spool 33 in response to pre-winding of the leader portion L of the filmstrip F onto the spool and is opened when the sensing finger returns to the spool once the filmstrip is completely wound off the spool. The switch $SW_L$ is closed when the lens cover 1 is closed and is opened when the lens cover is opened. The switch $SW_C$ is closed when the cartridge sensor 95 determines that the cartridge C is in the loading chamber 17 and is opened when the cartridge sensor determines that the loading chamber is empty. The switch $SW_M$ is closed by a cam 111 on the coaxial shaft 41, as shown in FIG. 3, each time the metering sprocket 43 is rotated a single revolution. When the metering switch $SW_M$ is closed, a metering pulse is generated in the microcomputer 97. The metering pulse is counted up in the up/down counter 109 during pre-winding movement of the filmstrip F, to increment the counter by "1", and is counted down during rewinding movement of the filmstrip, to similarly decrement the counter. A non-volatile memory 113 or other means, such as a back-up battery, is provided to maintain the pulse count in the up/down counter 109 when an on/off switch, not shown, on the camera body 3 is turned off but some film is present on the take-up spool 33.

Operation

Figure 7A:
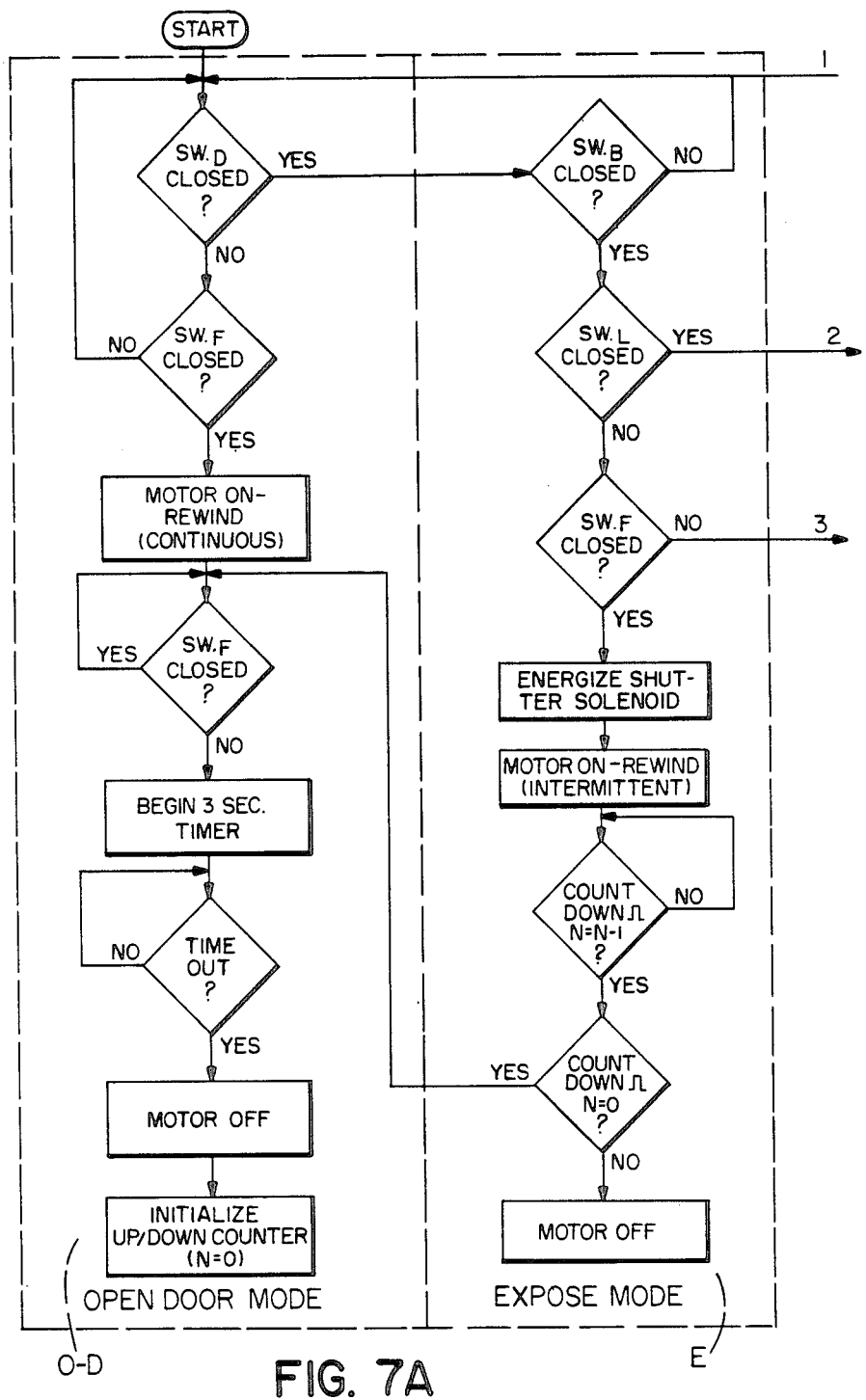
FIGS. 7a and 7b together form a flow chart illustrating operation of the control circuit.
Figure 7B:
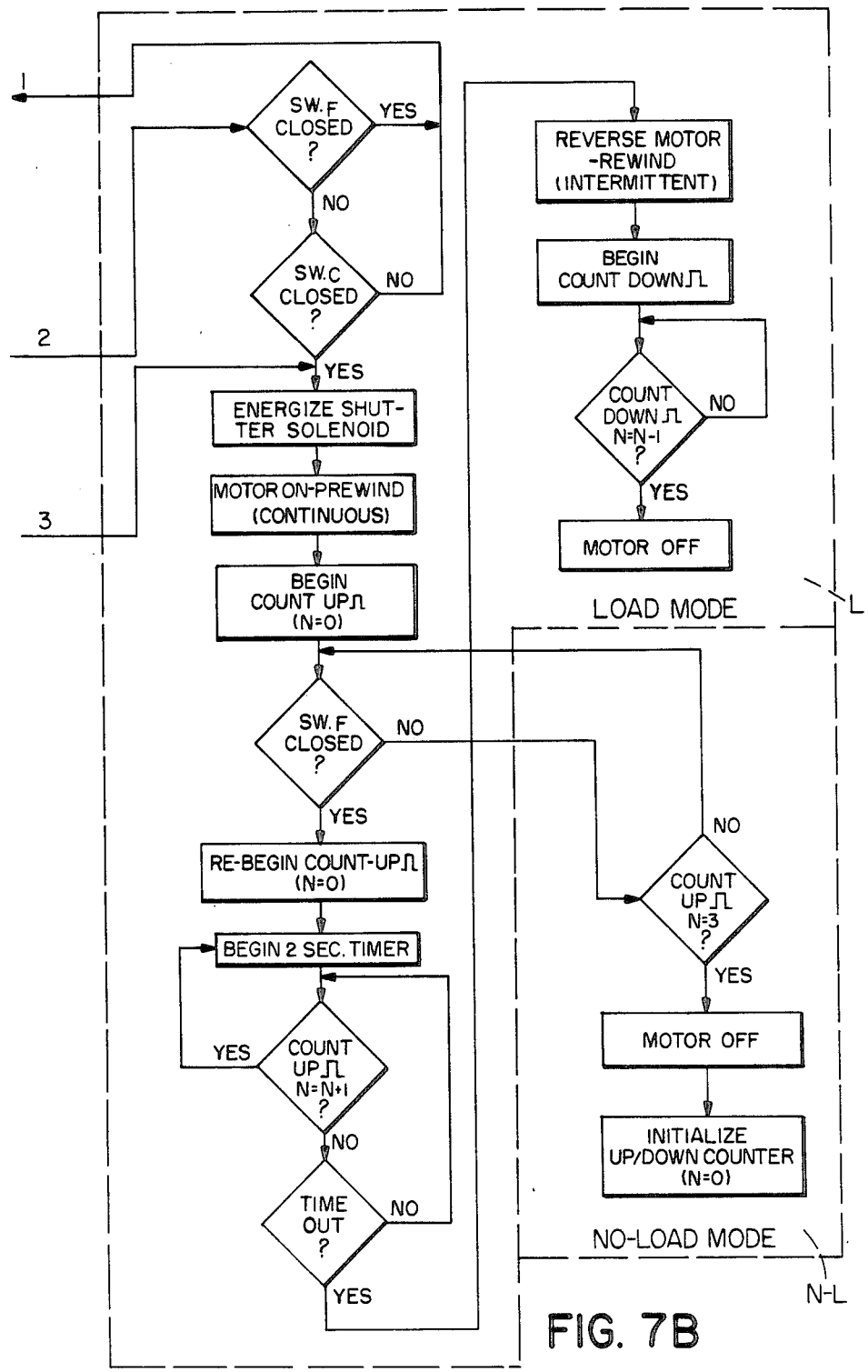

FIGS. 7a and 7b together form a flow chart which illustrates four explicit routines of the microcomputer 97 which are effected in cooperation with the switches $SW_D$, $SW_B$, $SW_F$, $SW_L$, $SW_C$, and $SW_M$ to control operation of the motorized film drive mechanism 83.

(1) Load Mode

This mode corresponds to the routine L of the microcomputer 97. If the switch $SW_D$ is closed because the rear door 7 is closed, the switch $SW_B$ is closed because the shutter release button 39 is depressed, and either (a) the switch $SW_L$ is open because the lens cover 1 is open and the switch $SW_F$ is open because no film is present on the take-up spool 1, or (b) the switch $SW_L$ is closed because the lens cover is closed, the switch $SW_F$ is open, and the switch $SW_C$ is closed because the cartridge C is in the loading chamber 17, then a shutter solenoid 115 will be actuated to release the camera shutter, not shown, for opening and closing. Following this, the motor 85 will be energized to drive the transmission 87 in a pre-wind direction for film movement as depicted by the arrow R in FIG. 6. The transmission 87 will rotate the metering sprocket 43 and the drive hub 89 for the take-up spool 33. At this time, the drive hub 91 for the supply spool 11 of the cartridge C is disconnected from the transmission 87, allowing the supply spool to idle. After the motor 85 is energized, the up/down counter 109 will begin to count up from "0" by "1" each time a metering pulse is produced in response to closing of the switch $SW_M$, when the metering sprocket 43 completes a single revolution. If the switch $SW_F$ is closed because the leader portion L of the filmstrip F has been wound onto the take-up spool 33, the two sec. timer 105 will begin and the up/down counter 109 will re-begin its count-up from "0". The substantial length of the filmstrip F, following the leader portion L, will then be pre-wound onto the take-up spool 33. If the up/down counter 109 is incremented by "1" before the two sec. timer 105 times out, the timer will begin again. When the substantial length of the filmstrip F has been pre-wound onto the take-up spool 33, the take-up spool is prevented from withdrawing the remainder of the filmstrip from the cartridge C because a trailing end of the filmstrip is secured to the supply spool 11 within the cartridge. This end of film condition causes film movement to stall. As a result, the up/down counter 109 will not be incremented by "1" before the two sec. timer 105 times out. This causes the motor 85 first to be de-energized and then to be re-energized in an opposite direction to drive the transmission 87 in a rewind direction for film movement as depicted by the arrow R in FIG. 6. The reversed transmission 87 pivots an operatively connected gear or the like, not shown, into driving relation with the drive hub 91 for the supply spool 11 of the cartridge C, causing the hub and the spool to be rotated by the transmission to wind up the filmstrip F as it is returned to the cartridge. Simultaneously, the up/down counter 109 begins a countdown of the metering pulses from its total count obtained during pre-winding. When the up/down counter 109 is decremented by "1", the first frame of the filmstrip F will be in the focal plane of the objective lens 5. Then, the motor 85 is de-energized, thereby concluding the load mode L.

Thus, in the load mode, the first frame of the filmstrip F can be advanced to the focal plane of the objective lens 5, whether the lens cover 1 is opened or closed, when the cartridge C is in the loading chamber 17 and the take-up spool 33 is initially empty.

(2) No-Load Mode

This mode corresponds to the routine N-L of the microcomputer 97. If, in the load mode L, the switch $SF_F$ remains open because the leader portion L of the filmstrip F is not wound onto the take-up spool 33 after the motor 85 is energized to drive the transmission 87 in the pre-wind direction and if, in the no-load mode N-L, the up/down counter 109 counts up to "3", but the switch $SW_F$ has not yet closed because the take-up spool is still empty, the motor will be de-energized and the counter will be reset to "0", thereby concluding the no-load mode.

Thus, the no-load mode has application when a film take-up malfunction has occurred because the leader portion L of the filmstrip F has failed to be secured to the take-up spool 33 and when camera operation is demonstrated in a dry run, i.e., without the cartridge C in the loading chamber 17.

(3) Expose Mode

This mode corresponds to the routine E of the microcomputer 97. If the switch SW$_D$ is closed because the rear door 7 is closed, the switch SW$_B$ is closed because the shutter release button 39 is depressed, the switch SW$_L$ is open because the lens cover 1 is open, and the switch SW$_F$ is closed because film is present on the take-up spool 33, then the shutter solenoid 115 will be energized to release the camera shutter for opening and closing. Following this, the motor 85 will be energized to drive the transmission 87 in the rewind direction. As a result, the supply spool 11 of the cartridge C will be rotated by the drive hub 91 to rewind an exposed frame into the cartridge, and the take-up spool 33 will be rotated by the drive hub 89 to advance a fresh frame off the take-up spool and into the focal plane of the objective lens 5. When the up/down counter 109 is decremented by "1", but the counter has not dropped to "0", the motor 85 will be de-energized, thereby concluding the exposure mode E. Otherwise, if the up/down counter 109 has dropped to "0", then, when the switch SW$_F$ is closed because the filmstrip F has been completely wound off the take-up spool, the three sec. timer 107 will begin. When the three sec. timer 107 times out, the leader portion L of the filmstrip F will have been rewound into the cartridge C. Then, the motor 85 will be de-energized and, merely as a precaution, the up/down counter 109 will be re-initialized, thereby concluding the exposure mode.

If in the expose mode the switch SW$_L$ is closed because the lens cover 1 is closed and the switch SW$_F$ is closed because film is present on the take-up spool 33, then the expose mode will be prematurely cancelled to prevent energization of the shutter solenoid 115 and the motor 85.

(4) Open Door Mode

This mode corresponds to the routine O-D of the microcomputer 97. If the switch SW$_D$ is open because the rear door 7 is open, but the switch SW$_F$ is closed because film is present on the take-up spool 1, the motor 85 will be energized to drive the transmission 87 in the rewind direction. Then, only when the switch SW$_F$ is opened because the filmstrip F has been completely wound off the take-up spool 33, the three sec. timer 107 will begin. When the three sec. timer 107 times out, the leader portion L of the filmstrip F will have been rewound into the cartridge C. Then, the motor 83 will be de-energized and, merely as a precaution, the counter 109 will be re-initialized, thereby concluding the open door mode.

The invention has been described with reference to a preferred embodiment. However, it will be appreciated that variations and modifications can be effected within the ordinary skill in the art without departing from the scope of the invention. For example, a combination of logic gates or switching circuits which make digital decisions may be used in controlling operation of the motorized film drive mechanism 83. Alternatively, a mechanical analog system may be used. In another example, a tension sensing member responsive to the sudden increase in film tension arising at the end of prewinding, when the take-up spool 33 attempts to withdraw the remainder of the filmstrip F from the cartridge C, may be used to reverse the motor 85. In a third example, the up/down counter 109 may be connected to a decoder which, in turn, is connected to a liquid crystal display or a light emitting diode array to provide an indication of the frame count. In a fourth example, in place of the film-on-spool sensor 77, means for sensing rotation of the metering sprocket 43 during movement of the filmstrip F in the prewind direction may be used to determine that film is present on the take-up spool. In a fifth example, in place of the cartridge sensor 95, means for reading a film speed or other code on the cartridge C may be used to determine that the cartridge is in the loading chamber 17.

I claim:

1. An improved photographic camera of the type wherein (a) a loading chamber is adapted to receive a film cartridge containing an unexposed filmstrip, (b) a film drive is actuated to advance the unexposed filmstrip from a cartridge in said loading chamber to position respective frames on the filmstrip for exposure, and (c) manual means is operated to change said camera from a storage mode to a picture-taking mode, wherein the improvement comprises:

means for sensing that a film cartridge is in said loading chamber;
   means for sensing that the filmstrip has not been advanced from the cartridge to position a first frame on the filmstrip for exposure; and
   control means cooperating with each of said sensing means for actuating said film drive to advance the filmstrip to position its first frame for exposure whether said camera is in its picture-taking mode or in its storage mode, when a cartridge is in said loading chamber and the filmstrip has not been advanced to position the first frame for exposure, but preventing exposure of the first frame at said position unless said manual means is operated to change said camera from its storage mode to its picture-taking mode.

2. An improved photographic camera of the type wherein (a) a loading chamber is adapted to receive a film cartridge containing an exposed filmstrip, (b) a film take-up spool takes up the filmstrip from a cartridge in said loading chamber, (c) a film drive is actuated to advance respective frames on the filmstrip to a position for exposing each frame, and (d) manual means is operated to change said camera from a storage mode to a picture-taking mode, wherein the improvement comprises:

cartridge sensing means for sensing that a film cartridge is in said loading chamber;
   film sensing means for sensing that said take-up spool is empty; and
   control means cooperating with said cartridge sensing means and said film sensing means for actuating said film drive to advance a first frame on the filmstrip to the position for exposing the first frame whether said camera is in its picture-taking mode or in its storage mode, when a film cartridge is in said loading chamber and said take-up spool is empty, but preventing exposure of the first frame at said position unless said manual means is operated to change said camera from its storage mode to its picture-taking mode.

3. An improved photographic camera of the type wherein (a) a loading chamber is adapted to receive a film cartridge containing an unexposed filmstrip, (b) a film take-up spool takes up the filmstrip from a cartridge in said loading chamber, (c) a lens cover is closed and opened to cover and uncover an objective lens, and (d) a film drive is actuated to advance respective frames on the filmstrip to a focal plane of said objective lens after each exposure of a fresh frame at the focal plane, and wherein the improvement comprises:

cartridge sensing means for sensing that a film cartridge is in said loading chamber;

film sensing means for sensing that said take-up spool is empty; and control means cooperating with said cartridge sensing means and said film sensing means for actuating said film drive whether said lens cover is opened or closed, when a film cartridge is in said loading chamber and said take-up spool is empty, to advance a first frame on the filmstrip to the focal plane of said objective lens, but preventing exposure of the first frame at the focal plane unless said lens cover is opened.

4. An improved photographic camera of the type wherein (a) a loading chamber is adapted to receive a film cartridge containing an unexposed filmstrip, (b) a film take-up spool takes up the filmstrip from a cartridge in said loading chamber, (c) a lens cover is closed and opened to cover and uncover an objective lens, and (d) a motorized film drive is actuated to advance respective frames on the filmstrip to a focal plane of said objective lens after each exposure of a fresh frame at the focal plane, and wherein the improvement comprises:

cartridge sensing means for sensing that a film cartridge is in said loading chamber;

film sensing means for sensing that said take-up spool is empty;

cover sensing means for sensing that said lens cover is closed; and control means for preventing actuation of said motorized film drive to advance respective frames on the filmstrip to the focal plane of said objective lens, when said lens cover is closed and substantially any of the filmstrip is on said take-up spool, but permitting actuation of the film drive to advance the first frame on the filmstrip to the focal plane even though the lens cover is closed, when a film cartridge is in said loading chamber and the take-up spool is empty.

5. An improved photographic camera of the type wherein (a) a loading chamber is adapted to receive a film cartridge containing an unexposed filmstrip (b) a lens cover is closed and opened to cover and uncover an objective lens, and (c) a motorized film drive is actuated to prewind substantially the entire length of a filmstrip from a cartridge in said loading chamber onto a take-up spool without exposing successive frames on the filmstrip at a focal plane of said objective lens and to rewind the filmstrip one frame at a time back into the cartridge after each exposure of a fresh frame at the focal plane, and wherein the improvement comprises:

cartridge sensing means for sensing that a film cartridge is in said loading chamber;

film sensing means for sensing that said take-up spool is empty;

cover sensing means for sensing that said lens cover is closed; and control means for preventing actuation of said motorized film drive to rewind the filmstrip to locate a fresh frame on the filmstrip in the focal plane of said objective lens, when said lens cover is closed and substantially any of the filmstrip is on said take-up spool, but permitting actuation of the motorized film drive to prewind the filmstrip onto said take-up spool and rewind the filmstrip only to locate its first frame in the focal plane even though the lens cover is closed, when a film cartridge is in said loading chamber and the take-up spool is empty.

6. An improved photographic camera of the type wherein (a) a loading chamber is adapted to receive a film cartridge containing an unexposed filmstrip, (b) a lens cover is closed and opened to cover and uncover an objective lens, (c) a motorized film drive is actuated to prewind substantially the entire length of a filmstrip from a cartridge in said loading chamber onto a take-up spool without exposing successive frames on the filmstrip at a focal plane of said objective lens and to rewind the filmstrip one frame at a time back into the cartridge after each exposure of a fresh frame at the focal plane, and (d) shutter triggering means is actuated to initiate an exposure of the fresh frame, and wherein the improvement comprises:

cartridge sensing means for sensing that a film cartridge is in said loading chamber;

film sensing means for sensing that said take-up spool is empty;

cover sensing means for sensing that said lens cover is opened; and control means for actuating said motorized film drive whether said lens cover is opened or closed, when a film cartridge is in said loading chamber and said take-up spool is empty, to prewind the filmstrip onto the take-up spool and rewind the filmstrip only to advance its first frame to the focal plane of said objective lens, but preventing actuation of said shutter triggering means to initiate an exposure of the first frame at the focal plane unless said lens cover is opened.

7. An improved photographic camera of the type wherein (a) a loading chamber is adapted to receive a film cartridge containing an unexposed filmstrip, (b) a lens cover is closed and opened to cover and uncover an objective lens, and (c) a film drive is actuated to advance the unexposed filmstrip to position respective frames on the filmstrip for exposure at a focal plane of said objective lens, and wherein the improvement comprises:

cartridge sensing means for sensing that a film cartridge is in said loading chamber;

film sensing means for sensing that the filmstrip has not been advanced to position a first frame on the filmstrip for exposure at the focal plane of said objective lens; and control means cooperating with said cartridge sensing means and said film sensing means for actuating said film drive whether said lens cover is opened or closed, when a film cartridge is in said loading chamber and the filmstrip has not been advanced to position its first frame at the focal plane of said objective lens, but preventing exposure of the first frame at the focal plane unless said lens cover is opened.

* * * * *